United States Patent

Abe

[11] Patent Number: 6,154,454
[45] Date of Patent: Nov. 28, 2000

[54] RADIO COMMUNICATION DEVICE AND MOBILE COMMUNICATION SYSTEM

[75] Inventor: Masami Abe, Tokyo, Japan

[73] Assignee: Oki Electric Industry Co., Ltd, Tokyo, Japan

[21] Appl. No.: 09/205,385

[22] Filed: Dec. 4, 1998

[30] Foreign Application Priority Data

Dec. 10, 1997 [JP] Japan ................................ 9-339801

[51] Int. Cl.[7] .............................. H04B 7/216; H04J 3/24
[52] U.S. Cl. ............................................ 370/335; 370/349
[58] Field of Search ................................. 370/335, 342, 370/349, 320; 375/130; 455/518, 519

[56] References Cited

U.S. PATENT DOCUMENTS

| 5,343,494 | 8/1994 | Averst et al. | 370/342 |
|---|---|---|---|
| 5,623,485 | 4/1997 | Bi | 370/342 |
| 5,625,886 | 4/1997 | Raes | 455/519 |
| 5,673,260 | 9/1997 | Umeda et al. | 370/342 |
| 5,790,956 | 8/1998 | Lo et al. | 455/518 |
| 5,862,133 | 1/1999 | Schilling | 370/335 |
| 5,872,777 | 2/1999 | Brailean et al. | 370/349 |
| 5,875,178 | 2/1999 | Rahuel et al. | 370/349 |
| 5,930,244 | 7/1999 | Ariyoshi et al. | 370/335 |
| 5,930,723 | 7/1999 | Heiskari et al. | 455/518 |
| 5,966,371 | 10/1999 | Sherman | 370/342 |

*Primary Examiner*—Chau Nguyen
*Assistant Examiner*—Phuongchau Ba Nguyen
*Attorney, Agent, or Firm*—Rabin & Champagne, P.C

[57] ABSTRACT

A mobile communication system includes a base station and mobile stations divided into a plurality of groups. A radio communication device 10 at the base station spreads framed control information using a spreading code, and then transmits it via a control channel to the mobile stations. The radio communication device 10 includes a header spreading code generating section 16 which produces mutually different two spreading codes, and further includes a header adding section 17 which, using the mutually different two spreading codes, double-spreads information about allocation of an access right to corresponding one of the groups and adds the double-spread information as a frame header to a frame body representing the foregoing framed and spread control information.

14 Claims, 3 Drawing Sheets

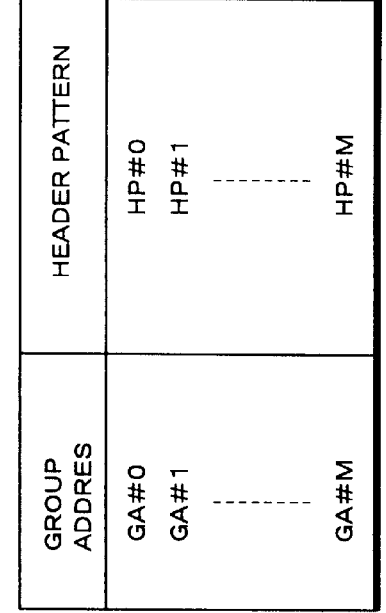
Fig. 2
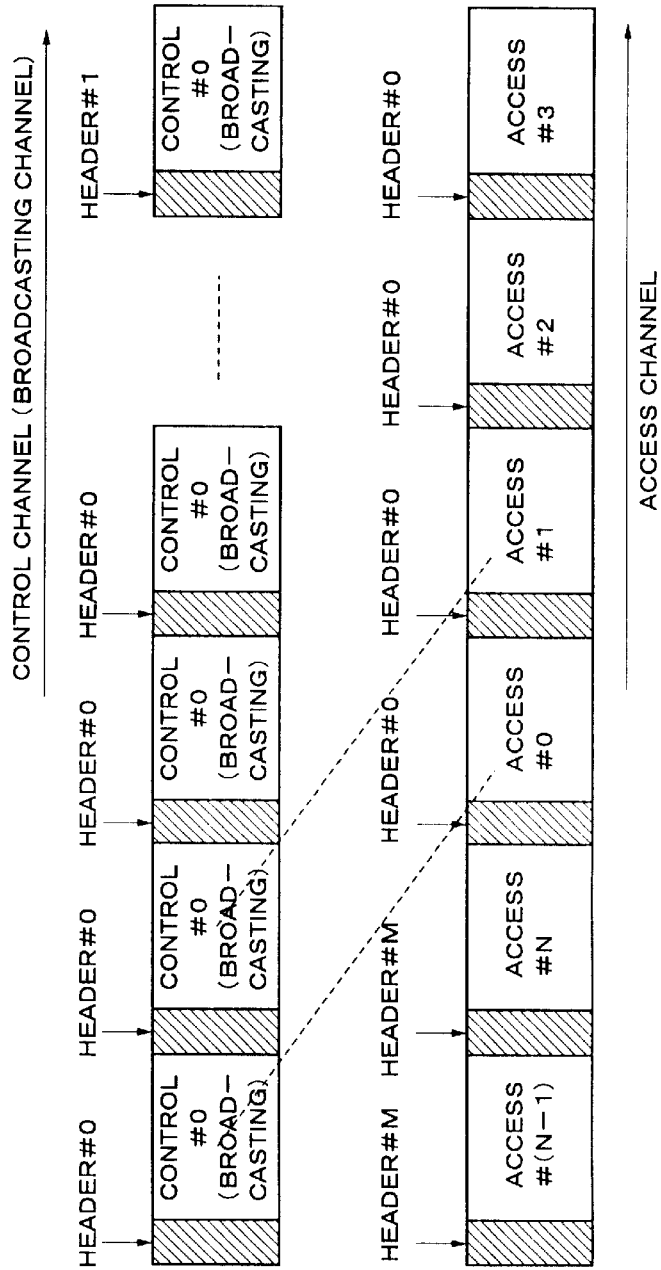
Fig. 3A
Fig. 3B

RADIO COMMUNICATION DEVICE AND MOBILE COMMUNICATION SYSTEM

BACKGROUND OF THE INVENTION

1. Field of the Invention

The present invention relates to a radio communication device and a mobile communication system and, in particular, to a radio communication device and a mobile communication system which employ a CDMA (code division multiple access) system using spreading codes.

2. Description of the Rerated Art

In a CDMA mobile communication system, a large number of mobile stations are divided into a plurality of groups for avoiding concentration of call requests from the mobile stations to a base station. The base station transmits access right allocating information to the mobile stations using a control channel such as a paging channel or a broadcasting channel. The access right allocating information represents an access right allocated to each of the groups for call requests from the mobile stations belonging to the corresponding group.

The mobile stations carry out, for example, calling for location registrations on the basis of the access right allocating information.

In the CDMA mobile communication system, regardless of whether the control channel for transmitting the foregoing access right allocating information is a paging channel or a broadcasting channel, the access right allocating information is subjected to error correction coding along with other channel information for countermeasure against bit errors caused due to noise, then spread by a spreading code and multiplexed with the other channel information so as to be transmitted to the mobile stations as a multiplex spread signal.

Thus, for knowing whether an access right is allocated, each mobile station re-spreads or despreads the received multiplex spread signal using the foregoing spreading code and then applies error correction decoding to the despread signal with respect to each of frames of the channel information including the access right allocating information.

Accordingly, in the conventional CDMA mobile communication system, the error correction decoding is essential at each of the mobile stations with respect to each of the frames of the channel information including the access right allocating information so that it takes a relatively long time for confirming whether the access right is allocated or not. Thus, delays are caused in the confirmation processes for the access rights at the respective mobile stations so that concentration of call requests is liable to occur.

For avoiding such call request concentration so as to smoothly deal with call requests from as many mobile stations as possible, it is quite effective to shorten the time required for the confirmation process for the access right allocation.

SUMMARY OF THE INVENTION

Therefore, it is an object of the present invention to provide a mobile communication system wherein a confirmation process for access right allocation can be quickly carried out.

It is another object of the present invention to provide an improved radio communication device for a base station to be used in the foregoing mobile communication system.

It is another object of the present invention to provide an improved radio communication device for a mobile station to be used in the foregoing mobile communication system.

According to one aspect of the present invention, there is provided a radio communication device for a base station in a mobile communication system, wherein channel information is framed and transmitted to mobile stations which are divided into a plurality of groups, the radio communication device comprising a header adding section adding selected one of a plurality of header patterns corresponding to the groups respectively to a frame header.

According to another aspect of the present invention, there is provided a radio communication device for a base station, wherein control information is framed and spread by a spreading code, and then transmitted via a control channel to mobile stations which are divided into a plurality of groups, the radio communication device comprising a spreading code generating section which produces mutually different two spreading codes; and a header adding section which, using the mutually different two spreading codes, double-spreads information about allocation of an access right to corresponding one of the groups and adds the double-spread information as aL frame header to a frame body representing the framed and spread control information.

It may be arranged that one of the mutually different two spreading codes is identical with the spreading code used to spread the control information.

It may be arranged that the header adding section cyclically changes the frame header information every given number of frames each including the frame header and the frame body, so as to cyclically change in turn the group to be allocated the access right.

It may be arranged that the control information includes information about a radio logical channel structure.

It may be arranged that the control channel is a paging channel for transmitting information notifying a call reception to the corresponding mobile station.

It may be arranged that the control channel is a broadcasting channel for transmitting information about the base station to the mobile stations.

According to another aspect of the present invention, there is provided a radio communication device provided at each of mobile stations divided into a plurality of groups, the radio communication device receiving control information sent from a base station via a control channel in the form of frames, each of the frames including a frame header representing header information about allocation of an access right, the header information double-spread by mutually different two spreading codes, the radio communication device comprising a despreading section which despreads the header information of the received control information using the mutually different two spreading codes; and an access right detecting section which, based on the header information despread at the despreading section, judges whether the access right is allocated to the subject mobile station.

It may be arranged that the radio communication device further comprises an access transmission command section which, when the access right detecting section judges that the access right is allocated to the subject mobile station, produces after a lapse of a given time a transmission command signal for an access to the base station via an access channel.

It may be arranged that the access to the base station is a transmission to the base station for one of a location registration of the subject mobile station and a call request.

It may be arranged that the control information includes information about a radio logical channel structure.

It may be arranged that the control channel is a paging channel for transmitting information notifying a call reception to the corresponding mobile station.

It may be arranged that the control channel is a broadcasting channel for transmitting information about the base station to the mobile stations.

According to another aspect of the present invention, there is provided a mobile communication system including the foregoing radio communication device for the base station.

According to another aspect of the present invention, there is provided a mobile communication system including the foregoing radio communication device for the mobile station.

BRIEF DESCRIPTION OF THE DRAWINGS

The present invention will be understood more fully from the detailed description given hereinbelow, taken in conjunction with the accompanying drawings.

In the drawings:

FIG. 2 is a diagram for explaining storage contents of a header register shown in FIG. 1;

FIG. 3A is a diagram for explaining a radio frame structure of a control channel (broadcasting channel) according to the first preferred embodiment of the present invention;

FIG. 3B is a diagram for explaining a radio frame structure of an access channel according to the first preferred embodiment of the present invention.

DESCRIPTION OF THE PREFERRED EMBODIMENT

Now, preferred embodiments of the present invention will be described hereinbelow with reference to the accompanying drawings.

First Embodiment

Figure 1:
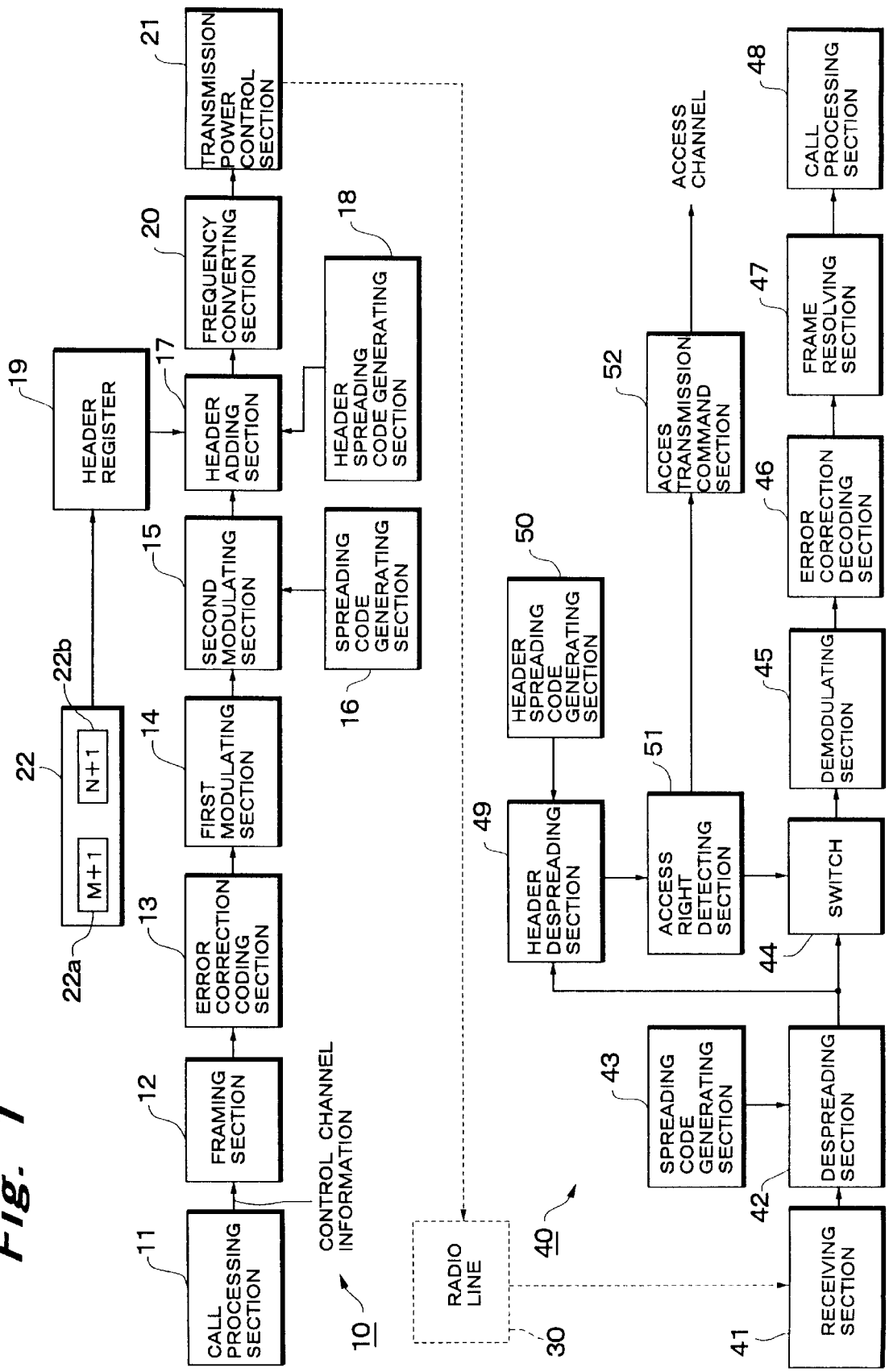
FIG. 1 is a block diagram showing a transmitter and a receiver with respect to a broadcasting channel according to a first preferred embodiment of the present invention.

FIG. 1 is a block diagram showing part of a mobile communication system with respect to a control channel according to the first preferred embodiment of the present invention.

In the mobile communication system, a down-link control channel transmitter 10 provided at a base station is connected via a radio line 30 to a down-link control channel receiver 40 provided at each of mobile stations.

The transmitter 10 comprises a call processing section 11, a framing section 12, an error correction coding section 13, a first modulating section 14, a second modulating section 15 working as a spreading section, a spreading code generating section 16, a header adding section 17, a header spreading code generating section 18, a header register 19, a frequency converting section 20, a transmission power control section 21 and in access right command section 22.

The call processing section 11 outputs control channel information to the framing section 12 in a known manner. The control channel includes a paging channel for transmitting call information notifying, for example, a call reception to the corresponding mobile station, control information about traffic channels and information about spreading codes, and a broadcasting channel for transmitting broadcast information including, for example, a logical channel structure of the radio line and information about the base station.

In the following description, it is assumed that the broadcasting channel is used as the control channel for access right allocation.

The framing section 12 carries out a framing operation to divide the broadcast information from the call processing section 11 into data units so as to form a framed signal.

The error correction coding section 13 adds an error correcting code to each of the data units from the framing section 12. In this embodiment, the error correction coding section 13 carries out the convolutional coding.

The first modulating section 14 carries out first modulation to modulate a carrier using the code-added framed signal from the error correction coding section 13 and outputs a modulated signal. As the first modulation, well known FSK (frequency shift keying) or PSK (phase shift keying) may be used.

The modulated signal, representing the broadcast information, from the first modulating section 14 is fed to the second modulating section 15. The second modulating section 15 spreads in a known manner the modulated signal from the first modulating section 14 using a spreading code, for example, a PN code (PN#1), produced at the spreading code generating section 16.

The header adding section 17 receives from the header register 19 a signal indicative of information about an access right (access right allocating information), that is, a header pattern.

Specifically, as shown in FIG. 2, the header register 19 stores (M+1) header patterns HP#0 to HP#M corresponding to group addresses GA#0 to GA#M. The group addresses GA#0 to GA#M correspond to mobile station groups, respectively. As appreciated, each group includes a plurality of mobile stations. Accordingly, when one of the group addresses GA#0 to GA#M is received from the access right command section 22, the header register 19 outputs to the header adding section 17 one of the header patterns HP#0 to HP#M which corresponds to the group address received from the access right command section 22.

In response to receipt of the header pattern HP#m (m=0 to M) from the header register 19, the header adding section 17 spreads the header pattern HP#m using a double-spreading code produced at the header spreading code generating section 18 so as to obtain the double-spread header pattern HP#m. Then, the header adding section 17 forms a frame by adding the double-spread header pattern HP#m as a frame header to the spread signal, per data unit, from the second modulating section 15 as a frame body.

The double-spreading code, i.e. the header spreading code, produced at the header spreading code generating section 18 is given by the following equation:

$$PN\#2 = PN\#1 \times PN\#X$$

wherein PN#2 represents the double-spreading code produced at the header spreading code generating section 18, PN#1 represents the spreading code produced at the spreading code generating section 16, and PN#1 and PN#X differ from each other.

As compared with the spreading code PN#1, the double-spreading code PN#2 provides an increased spreading gain which is PN#X spreading gain times greater. Further, the double-spreading code PN#2 contains components of the spreading code PN#1.

An output signal, indicative of the foregoing frames each with the double-spread frame header, from the header adding section 17 is inputted into the frequency converting section 20 where its frequency is increased to a radio frequency (RF) band.

The RF signal from the frequency converting section 20 is subjected to a transmission power control at the transmission power control section 21 including a power amplifier and so forth, and then radiated into the radio line 30, i.e. the space, from a transmission-reception antenna (not shown). The frequency converting section 20 and the transmission power control section 21 constitute a well-known radio transmission section.

The access right command section 22 comprises an (M+1) cyclic counter 22a and an (N+1) cyclic counter 22b. The cyclic counter 22a increments a counter value from 0 to M in sequence every time it receives a count-up signal from the cyclic counter 22b. On the other hand, when a desired value N is set, the cyclic counter 22b outputs the count-up signal to the cyclic counter 22a every time the number of the frames processed at the header adding section 17 reaches N+1.

Accordingly, if, for example, N=0 is set at the cyclic counter 22b, the cyclic counter 22b outputs a count-up signal to the cyclic counter 22a every time the header adding section 17 processes one frame, and the cyclic counter 22a advances the group address GA#m by one every time it receives the count-up signal from the cyclic counter 22b.

Thus, if N=0, every time the header adding section 17 processes one frame, a value of the group address GA#m given to the header register 19 from the access right command section 22 changes one by one from 0 to M in a recurring manner. As a result, the mobile station group to be allocated the access right is updated in sequence from 0 to M in a recurring manner every time the header adding section 17 processes one frame.

Similarly, if N=1 is set at the cyclic counter 22b, the group address GA#m is updated every time the header adding section 17 processes two frames.

Therefore, as shown in FIG. 3A, on the broadcasting channel (control channel), the same header pattern HP#m is repeated over (N+1) frames. Specifically, the header pattern HP#m is updated in sequence every (N+1) frames so that the mobile station group to be given the access right recurs from 0 to M.

When a slotted ALOHA system is used as an access technique, it is preferable that a value of (N+1) is set to the number of time frames (time slots). It is also preferable that a value of (N+1) is set to the number of frames forming the broadcast information.

As described above, according to the transmitter 10 shown in FIG. 1, the frame header representing the access right allocating information, i.e. the header pattern HP#m, is double-spread at the header adding section 17 using the double-spreading code, i.e. the product of two different spreading codes, produced at the header spreading code generating section 18. Thus, as compared with the frame body spread by the single spreading code produced at the spreading code generating section 16, the signal-to-noise ratio of the frame header is significantly improved.

Accordingly, although the frame body is subjected to the error correction coding at the error correction coding section 13, the frame header does not need to be subjected to the error correction coding since, as described above, the signal-to-noise ratio thereof is increased PN#X spreading gain times.

The receiver 40 receives at a transmission-reception antenna (not shown) the RF signal sent from the transmitter 10. As described above, the RF signal is indicative of the frames of the broadcast information each constituted by the frame header and the frame body. Ad shown in FIG. 1, the receiver 40 comprises a receiving section 41, a despreading section 42, a spreading code generating section 43, a switching circuit 44, a demodulating section 45, an error correction decoding section 46, a frame resolving section 47, a call processing section 48, a header despreading section 49, a header spreading code generating section 50, an access right detecting section 51 and an access transmission command section 52.

The receiving section 41 amplifies the RF signal received at the transmission-reception antenna and demodulates it to the state just prior to the frequency conversion carried out at the frequency converting section 20 in the transmitter 10.

The despreading section 42 despreads the demodulated signal from the receiving section 41 using the spreading code PN#1 given from the spreading code generating section 43. The spreading code PN#1 is identical with that produced at the spreading code generating section 16 in the transmitter 10.

The spreading code generating section 43 includes a matched filter or a sliding correlator in a known manner. The spreading code generating section 43 carries out synchronization acquisition and feeds the phase-matched spreading code PN#1 to the despreading section 42. The synchronization acquisition can be performed relatively easily using the foregoing double-spread frame header.

As appreciated, since the frame body was spread by the spreading code PN#1 in the transmitter 10, it is demodulated to the state just prior to the spreading carried out at the second modulating section 15 in the transmitter 10 through the despreading carried out at the despreading section 42.

The switching circuit 44 allows the signal from the despreading section 42 to be given to the demodulating section 45 only for time periods determined on the basis of commands from the access right detecting section 51 so that only the corresponding frame bodies may be fed to the demodulating section 45.

The demodulating section 45 demodulates the received frame bodies to the state just prior to the modulation carried out at the first modulating section 14 in the transmitter 10. The demodulated frame bodies are then subjected to error correction decoding at the error correction decoding section 46, and then resolved per frame so as to be reconstructed into the broadcast information which is then outputted to the call processing section 48.

The call processing section 48 analyzes the broadcast information so as to read, for example, information about a logical channel structure of the radio line and information about transmission to the base station, such as a frequency band, a spreading code (code channel) and a time slot to be used on an access channel. Depending on necessity, the call processing section 48 feeds such information to the access transmission command section 52.

More specifically, the call processing section 48, for example, divides an identification number of the subject mobile station (MSID) by the number of channels about frequencies, a channel number about the code channel and the number of time slots notified from the base station, respectively, and then recognizes the respective remainders as values representing the frequency band, the code channel and the time slot. These values are used on the access channel.

The header despreading section 49 further despreads the despread signal from the despreading section 42 using the header spreading code PN#X given from the header spreading code generating section 50 having the same structure and performing the same function as the spreading code generating section 43. As appreciated, the header spreading code PN#X is identical with the foregoing spreading code PN#X of the double-spreading code PN#2 (=PN#1×PN#X) produced at the header spreading code generating section 18 in the transmitter 10.

Since the despread signal from the despreading section 42 was already despread by the spreading code PN#1 as described above, only the frame header is outputted from the header despreading section 49 as an effective signal representing the header pattern HP#m.

Specifically, the despreading section 42 and the header despreading section 49 cooperatively constitute a double-despreading section for double-despreading the frame header using the two different spreading codes to obtain the header pattern.

The access right detecting section 51 receives the header pattern from the header despreading section 49. The access right detecting section 51 has a header pattern storage section storing a unique header pattern representing an access right of the group to which the subject mobile station belongs. In response to receipt of the header pattern from the header despreading section 49, the access right detecting section 51 judges whether the received header pattern agrees with the stored unique header pattern. If both header patterns agree with each other, the access right detecting section 51 operates (closes) the switching circuit 44 so as to allow the corresponding frame body to be given from the despreading section 42 to the demodulating section 45 via the switching circuit 44.

On the other hand, if both header patterns disagree with each other, the access right detecting section 51 operates (opens) the switching circuit 44 so as to prohibit the passing of the corresponding frame body therethrough. Accordingly, since the signal is not fed to the demodulating section 45, the foregoing operations of the sections 45 to 48 can be substantially stopped.

In case of both header patterns agreeing with each other, the access right detecting section 51 further outputs an access right allocated signal to the access transmission command section 52.

Since the same header pattern is repeated over (N+1) frames in this embodiment, the access right allocated signals are outputted (N+1) times from the access right detecting section 51 to the access transmission command section 52.

As the unique header pattern representing the access right of the group to which the subject mobile station belongs, a header pattern corresponding to the remainder of division of the MSID by the number of the header patterns may be used.

When an access to the base station is requested, the access transmission command section 52 counts the number of the foregoing access right allocated signals from the access right detecting section 51 up to a number corresponding to a position of the time slot notified from the call processing section 48 and, after a lapse of a given time (for example, a time corresponding to two frames) from a time point of the end of the counting, commands a transmitter (not shown) of the subject mobile station to carry out a transmission to the base station on the access channel.

FIG. 3B shows a frame structure of the access channel to the base station via a radio line. In the shown frame structure, each of the frames on the access channel has a frame header where a header pattern identical with that on the broadcasting channel is assigned. Specifically, on the access channel, there exist a plurality of time slots (frames) each having a header pattern identical with that on the broadcasting channel, and each of the mobile stations requests an access to the base station using the corresponding time slot associated with the subject mobile station.

In the mobile communication system according to the first preferred embodiment, a large number of mobile stations associated with one control channel (broadcasting channel or paging channel) are divided into a plurality of groups, and the mutually different header patterns are allocated to the corresponding groups, respectively.

Thus, since the large number of mobile stations associated with one control channel can be grouped using the header patterns given as the frame headers, the mobile stations can be divided into a desired number of groups and the information about grouping can be notified to each of the mobile stations.

Furthermore, as described above, in the mobile communication system according to the first preferred embodiment, the access right allocating information is added, as the frame header, to the frame body in the frame structure of the broadcasting channel, and the frame header is double-spread using the double-spreading code.

Since the frame header is double-spread, the error correction coding to the frame header is not necessary to provide at the transmitter 10. Thus, the error correction decoding is not required for the frame header at the receiver 40 so that it can be quickly judged by analyzing the frame header whether the access right is allocated to the subject mobile station or not.

Accordingly, since the time required for the confirmation process for the access right allocation can be shortened at each of the mobile stations, the delays which are otherwise caused at the respective mobile stations can be prevented to effectively avoid the concentration of call requests from the mobile stations to the base station.

Second Embodiment

In the foregoing first preferred embodiment, the access right allocating information is given to each of the frame headers of the frames on the broadcasting channel of the down-link control channel. On the other hand, the access right allocating information may be added, as a frame header, to each of frame bodies of frames on the paging channel of the down-link control channel.

Figure 4:
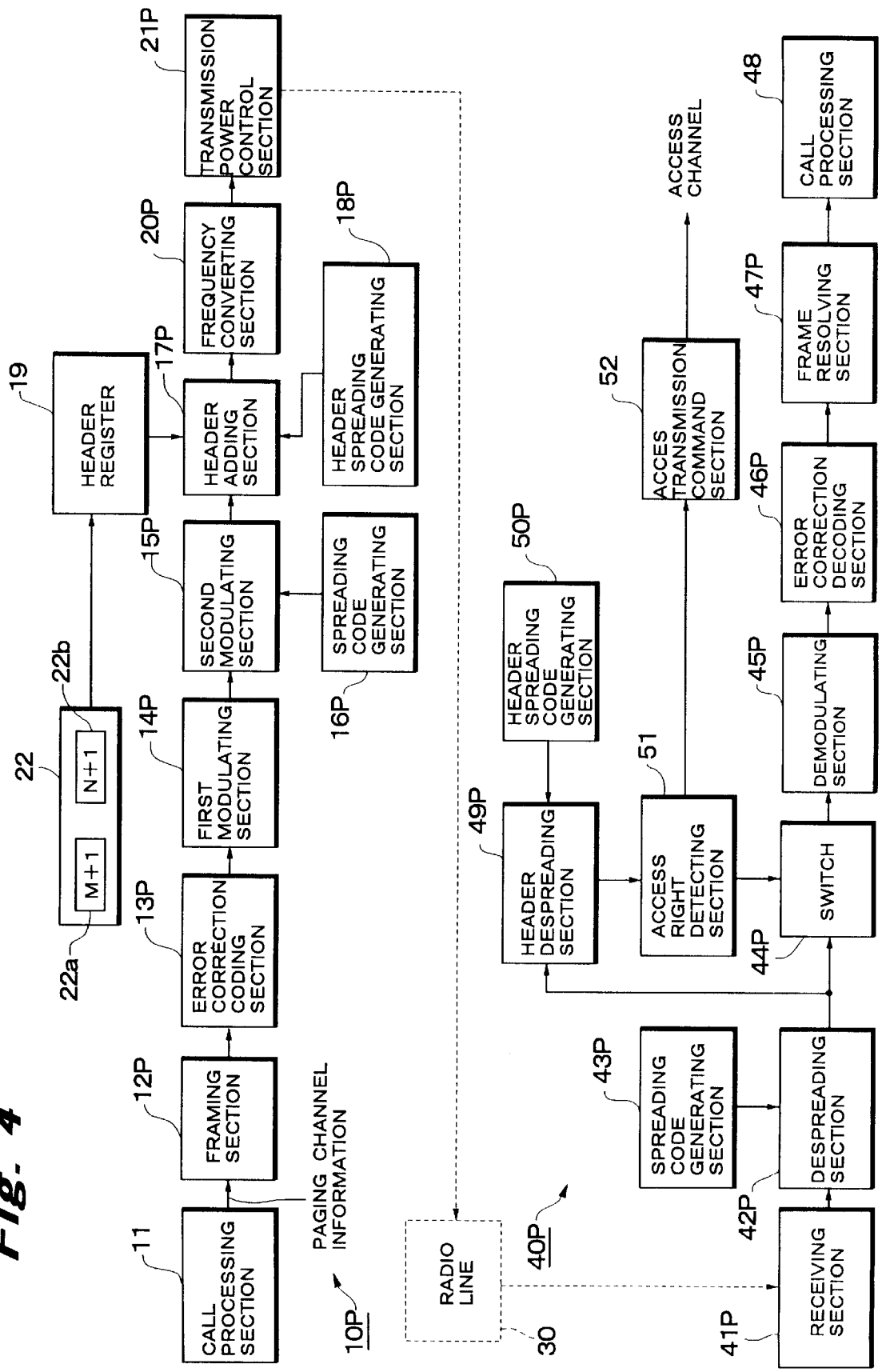
FIG. 4 is a block diagram showing a transmitter and a receiver with respect to a paging channel according to a second preferred embodiment of the present invention.

FIG. 4 shows a paging channel transmitter 10P and a paging channel receiver 40P. In FIG. 4, constituent portions corresponding to those shown in FIG. 1 are assigned the same numerals with a character P.

Since the transmitter 10P and the receiver 40P shown in FIG. 4 carry out essentially the same functions as the transmitter 10 and the receiver 40 shown in FIG. 1, explanation of each constituent portion is omitted for brevity of disclosure.

In FIGS. 1 and 4, the access right command section 22 and the header register 19 are commonly used by the transmitters 10 and 10P, and the access right detecting section 51 and the access transmission command section 52 are commonly used by the receivers 40 and 40P, so that matching is ensured for access right allocation between the broadcasting channel and the paging channel.

In this embodiment, the paging channel is used for access right allocation. Specifically, the foregoing header pattern is double-spread in the same manner as in the foregoing first preferred embodiment, and then added as a frame header to each of spread frame bodies of a given number of paging channel frames as in the foregoing first preferred embodiment.

The mobile station receives broadcast information sent from the base station to catch the radio logical channel structure, then finishes the receiving operation for the broadcast information, and then shifts to a wait state for the paging channel to receive a notification of call reception.

Accordingly, in this embodiment, since the double-spread header patterns are added as frame headers of the paging channel frames, the mobile station can confirm access right allocation thereto in the normal monitoring state for the paging channel after the receiving operation for the broadcasting channel.

Other Embodiments

The foregoing unique header pattern representing the access right of the group to which the subject mobile station belongs miy be given from the base station to each mobile station.

The number of the frames to which the same header pattern is assigned may be changed depending on the header patterns. For example, such a number may be changed depending on the number of the mobile stations belonging to each of the groups.

The access right allocating information may be transmitted using both the broadcasting channel and the paging channel, or using only one of them.

In the foregoing description, the mobile communication system employs the CDMA system. As appreciated, a TDMA (time division multiple access) system may be combined with the CDMA system.

According to the foregoing preferred embodiments, since the time required for the confirmation process for the access right allocation can be shortened at each of the mobile stations as compared with the prior art, the delays which are otherwise caused at the respective mobile stations can be prevented to effectively avoid the concentration of call requests from the mobile stations to the base station.

While the present invention has been described in terms of the preferred embodiments, the invention is not to be limited thereto, but can be embodied in various ways without departing from the principle of the invention as defined in the appended claims.

What is claimed is:

1. A radio communication device for a base station, wherein control information is framed and spread by a spreading code, and then transmitted via a control channel to mobile stations which are divided into a plurality of groups, said radio communication device comprising:

a header spreading code generating section which produces two mutually different spreading codes; and a header adding section applying said two mutually different spreading codes, such that information about allocation of an access right to a corresponding one of said groups is double-spread. said double-spread information being added as a frame header to a frame body representing said framed and spread control information.

2. The radio communication device according to claim 1, wherein one of said two mutually different spreading codes is identical with the spreading code used to spread said control information.

3. The radio communication device according to claim 1, wherein said header adding section cyclically changes said frame header information every given number of frames each including the frame header and the frame body, so as to cyclically change in turn the group to be allocated the access right.

4. The radio communication device according to claim 1, wherein said control information includes information about a radio logical channel structure.

5. The radio communication device according to claim 1, wherein said control channel is a paging channel for transmitting information notifying a call reception to the corresponding mobile station.

6. The radio communication device according to claim 1, wherein said control channel is a broadcasting channel for transmitting information about the base station to the mobile stations.

7. A mobile communication system including the radio communication device for the base station according to claim 1.

8. A radio communication device provided at each of mobile stations divided into a plurality of groups, said radio communication device receiving control information sent from a base station via a control channel in the form of frames, each of said frames including a frame header representing header information about allocation of an access right, said header information being spread by each of two mutually different spreading codes, said radio communication device comprising:

a despreading section which despreads said header information of the received control information using said two mutually different spreading codes; and an access right detecting section which, based on said header information despread at said despreading section, judges whether the access right is allocated to the subject mobile station.

9. The radio communication device according to claim 8, further comprising an access transmission command section which, when said access right detecting section judges that the access right is allocated to the subject mobile station, produces after a lapse of a given time a transmission command signal for an access to the base station via an access channel.

10. The radio communication device according to claim 8, wherein said access to the base station is a transmission to the base station for one of a location registration of the subject mobile station and a call request.

11. The radio communication device according to claim 8, wherein said control information includes information about a radio logical channel structure.

12. The radio communication device according to claim 8, wherein said control channel is a paging channel for transmitting information notifying a call reception to the corresponding mobile station.

13. The radio communication device according to claim 8, wherein said control channel is a broadcasting channel for transmitting information about the base station to the mobile stations.

14. A mobile communication system including the radio communication device for the mobile station according to claim 8.

* * * * *